United States Patent [19]

Clark

[11] 4,251,879
[45] Feb. 17, 1981

[54] SPEED INDEPENDENT ARBITER SWITCH FOR DIGITAL COMMUNICATION NETWORKS

[75] Inventor: Becky J. Clark, Tualatin, Oreg.

[73] Assignee: Burroughs Corporation, Detroit, Mich.

[21] Appl. No.: 35,315

[22] Filed: May 2, 1979

[51] Int. Cl.³ .............................................. H04J 6/00
[52] U.S. Cl. ...................................... 370/60; 370/94; 340/147 LP
[58] Field of Search ...................... 370/60, 61, 85, 92, 370/94; 179/18 G; 307/243; 340/147 CV, 147 CN, 147 T, 147 LP; 364/200

[56] References Cited

U.S. PATENT DOCUMENTS

| | | | |
|---|---|---|---|
| 3,353,160 | 11/1967 | Lindquist | 340/147 T |
| 4,048,441 | 9/1977 | Young | 340/147 LP |
| 4,156,798 | 5/1979 | Doelz | 370/94 |
| 4,189,766 | 2/1980 | Horiguchi et al. | 340/147 LP |

OTHER PUBLICATIONS

"Distributed Processing within an Integrated Circuit/Packet-Switching Node", by Jenny et al., *IEEE Trans. Communications,* vol. COM-24, No. 10, pp. 1089-1100, Oct. 1976.

*Primary Examiner*—Douglas W. Olms
*Attorney, Agent, or Firm*—Mervyn L. Young; Kevin R. Peterson

[57] ABSTRACT

A speed independent arbitration switch designed for pipelined message transmission through digital communication networks. The arbiter routes a message from one of two input paths to the output path and appends a bit to the message indicating the input path. When requests are present on both input paths, the arbiter accepts messages from them alternatively, choosing the first randomly if the requests arrive simultaneously.

6 Claims, 30 Drawing Figures

SPEED INDEPENDENT ARBITER SWITCH FOR DIGITAL COMMUNICATION NETWORKS

RELATED U.S. PATENT APPLICATIONS

U.S. patent applications directly or indirectly related to the subject application are the following:

Ser. No. 035,314 filed May 2, 1979 by Robert Stanley Barton and Becky Jane Clark and titled Digital Communication Networks Employing Speed Independent Switches; and Ser. No. 035,411 filed May 2, 1979 by Becky Jane Clark and titled Speed Independent Selector Switch For Digital Communication Networks.

BACKGROUND OF THE INVENTION

1. Field of the Invention

This invention pertains to networks of digital devices with shared components, which networks in turn may share components at a higher level. The interconnections are constructed from two kinds of speed independent switches called arbiters and selectors.

2. Description of the Prior Art

Prior art information handling systems have incorporated distributed processors and storage units. These can be expanded to accommodate higher storage capacities and data processing throughput. Such distributed systems have required a high degree of centralization of the system control with its associated programming problems.

It is an object of the present invention to provide an improved communications network for a distributed system.

It is another object of the present invention to provide a network for a distributed system wherein control is decentralized to the various units of the system.

It is still a further object of the present invention to provide a communications network for a distributed system which requires minimal or no software control.

SUMMARY OF THE INVENTION

The present invention is a speed independent arbitration switch designed for pipelined message transmission through digital communication networks. The arbiter routes a message from one of two input paths to the output path and appends a bit to the message indicating the input path. When requests are present on both input paths, the arbiter accepts messages from them alternately, choosing the first randomly if the requests arrive simultaneously.

Trees formed from arbiters provide arbitration for two or more devices requesting the use of a shared device.

Networks employing both arbiters and selectors can be formed for the transmission of messages among a number of devices.

BRIEF DESCRIPTION OF THE DRAWINGS

The above and other objects, advantages and features of the present invention will become more readily apparent from a review of the following specifications when taken in conjunction with the drawings wherein:

FIGS. 1A-11 are schematic diagrams of various networks illustrating the present invention;

GENERAL DESCRIPTION OF THE INVENTION

Communications in networks connected by arbiter and selector switches are in the form of serially transmitted messages which in the general case consist of three parts: destination address, body, and source address. The source address originates on the path where it is determined by the arbiter switches from the destination to the source. The destination address selects the path through the network to the destination and is used bit-by-bit in the selector switches along that path. In general, as a message moves through a network, an arbiter appends a bit to indicate through which of its two inputs a message entered and a selector removes the leading bit and selects through which of its two outputs the message leaves. A receiving device accepts first the message body and then the source address.

A particular bidirectional communication pattern for a set of two-terminal devices is describable by a net of oriented, directed graphs with ternary nodes. Such a graph is realizable in circuit form with a net of arbiters and selectors isomorphic to the graph.

The converse of an oriented directed graph is obtained by reversing all directions while leaving orientations unchanged. For arbiter-selector nets this requires substituting arbiters for selectors, selectors for arbiters, device inputs for outputs, and outputs for inputs.

Figure 1A:
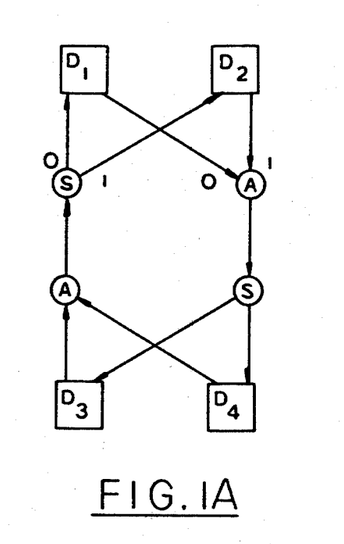
Figure 1B:
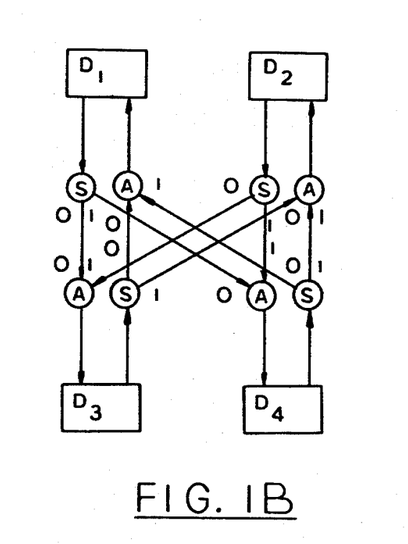

FIGS. 1A and 1B show two nets each permitting bidirectional communication between two sets of two devices. In each case the net is separable into two mutually converse nets. (The net of FIG. 1B allows four concurrent paths between the groups while the net of FIG. 1A allows only two concurrent paths).

A net is said to be self-converse if for each directed path connecting a pair of endpoints the converse path exists. The net then has the property that the source address of each path endpoint is the destination address from the other endpoint.

Figure 2:
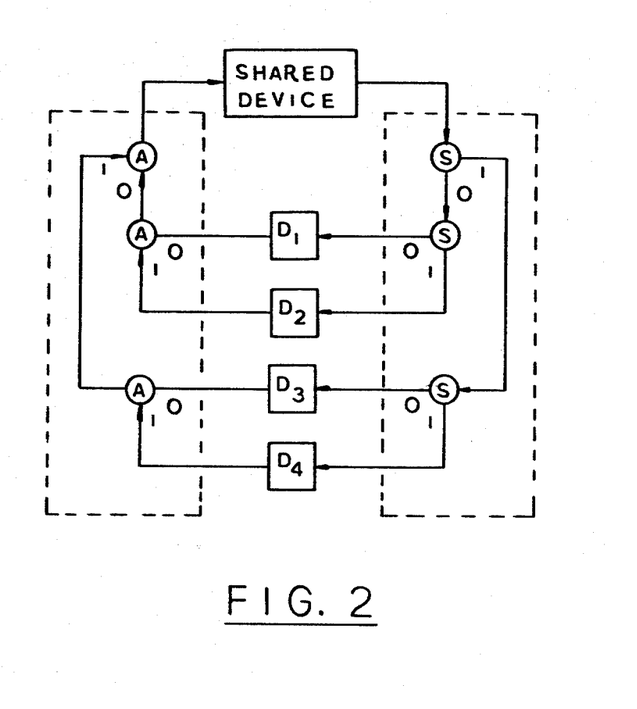
Figure 3:
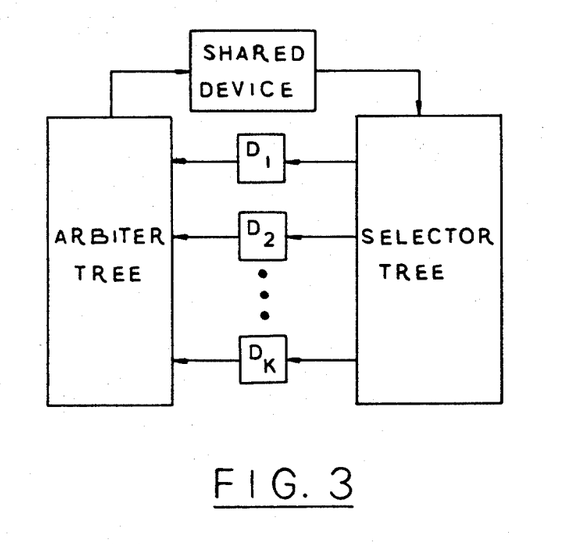

In the case of particular interest for this invention, a two-terminal system component (e.g., store, processor, I-O device, or system) can be shared by two or more devices connected via structurally similar trees of arbiter and selector switches. FIG. 2 illustrates the case for four sharing devices $D_1$, $D_2$, $D_3$, and $D_4$. FIG. 3 shows the general interconnection using trees of arbiters and selectors which have the property of being mutually converse networks.

Figure 4A:
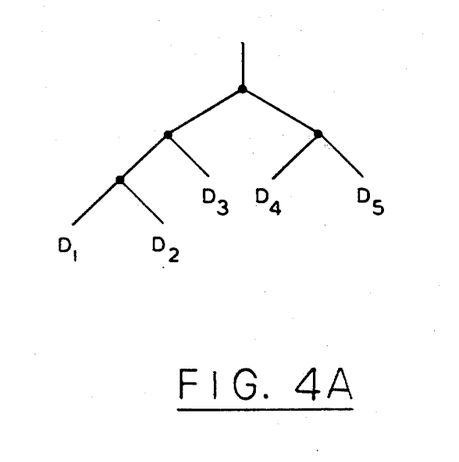
Figure 4B:
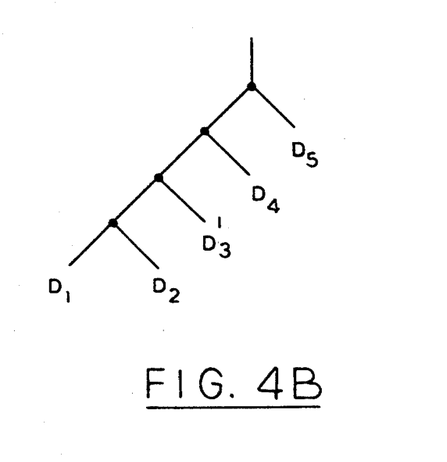

Any number of devices can be connected in this fashion. Since device identifications are generated internally in the arbiter trees and used internally in the selector trees, the spanning tree need not be unique; indeed, it may be determined for convenience in placement of the switches or for minimization of the total length of the interconnecting wires. FIGS. 4A and 4B show two arrangements for five devices.

In this type of network dialogs occur between a shared and sharing devices with a sharing device initiating each dialog. The messages to the shared device have null destination address parts since no selection is required, there being only one destination. The source address will arrive at the shared device appended to the message body. The reply will then use the source address as a destination address. In this way each dialog continues, and network addresses remain anonymous, thus permitting convenient expansion or contraction of the network.

A typical application is a set of computer terminals sharing a central process or database. Messages may consist of one or more characters. The central system will maintain a queue for each terminal in which messages from that terminal are assembled. All conflicting requests for lines will be resolved by the arbiter trees. Ordering of messages is automatic. Thus the central system has no need for a program to poll terminals or to represent configurations, such functions being accommodated in a decentralized manner in the switches.

A hierarchichal network similar to that familiar from telephone switching can be constructed by using a number of networks of the type shown in FIG. 3. If each network is broken at a device, the output and input connections can be used as the input and output of the network. The resulting two-terminal network can then be used as one of the devices of a similar network at a higher level, thus giving a hierarchical structure.

Figure 5:
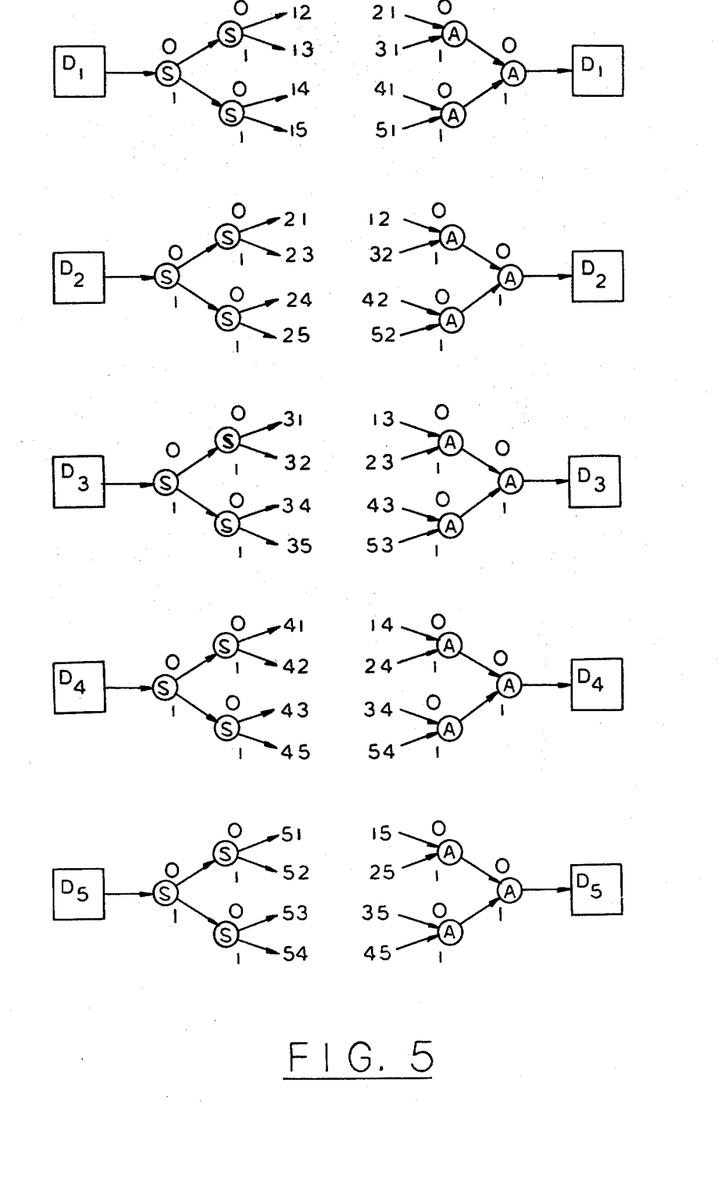

Another class of networks of interest is those networks where each device is connected symmetrically to some of the other devices. The networks of this form which give the maximum number of concurrent paths are those in which the device outputs are each connected to the root node of a selector tree and the device inputs are each connected to the root node of an arbiter tree with the leaf nodes of the trees connected to each other in such a manner that the network is self-converse. An example of this type of network where each of five devices is connected to the other four is shown in FIG. 5. When the trees are homogeneous, as in FIG. 5, all paths have equal priority, and all devices can be used concurrently if there is no conflict. This type of network is similar to conventional crossbars. If the trees used are not homogeneous, the shorter paths through the arbiter trees will have greater priority since under heavy loading an arbiter accepts messages alternately from its two inputs.

Figure 6:
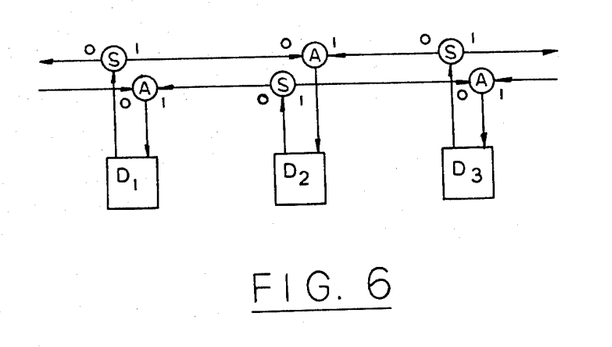
Figure 7:
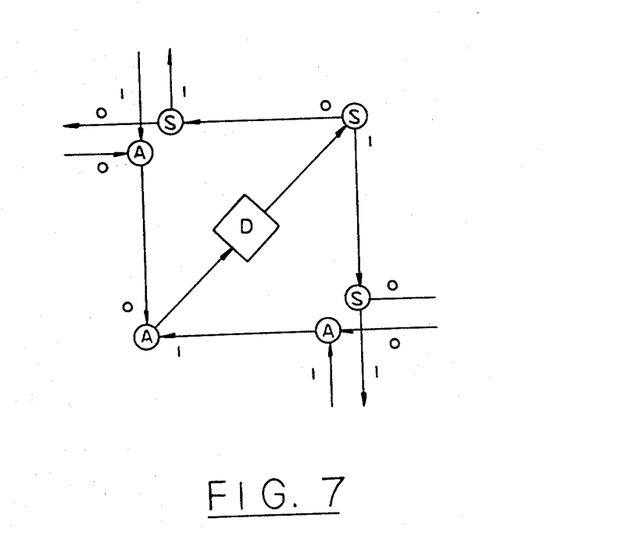

There are several special cases of the above class of networks which are of interest. The network of FIG. 6 connects each device to its two neighbors giving a linear array of devices. FIG. 7 shows the network associated with a device which can communicate with any of four neighbors. This interconnection gives a two dimensional array of devices.

Figure 8:
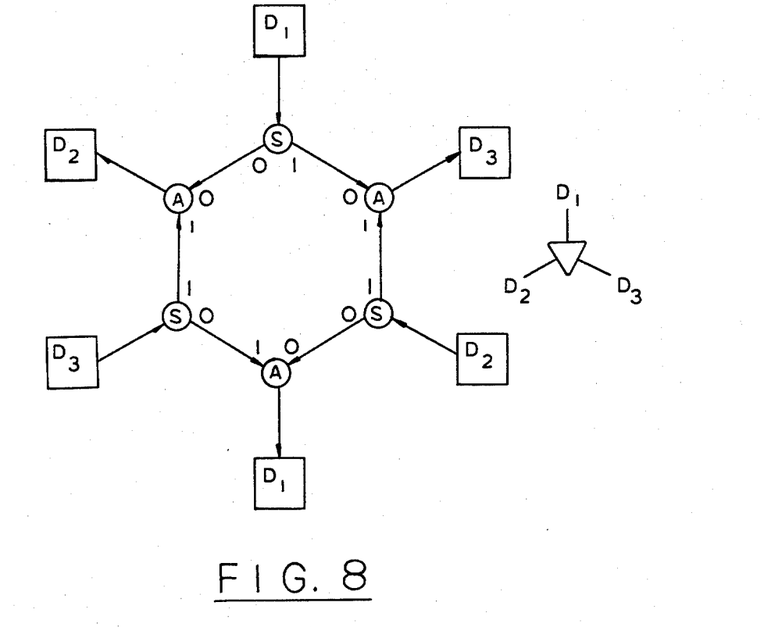
Figure 9:
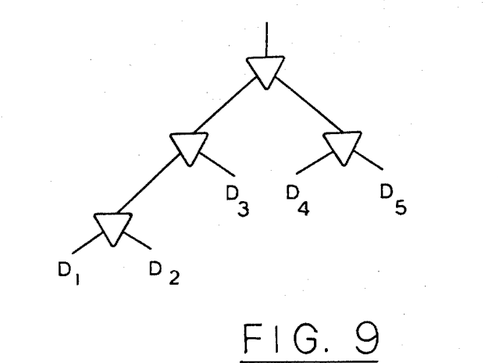
Figure 10:
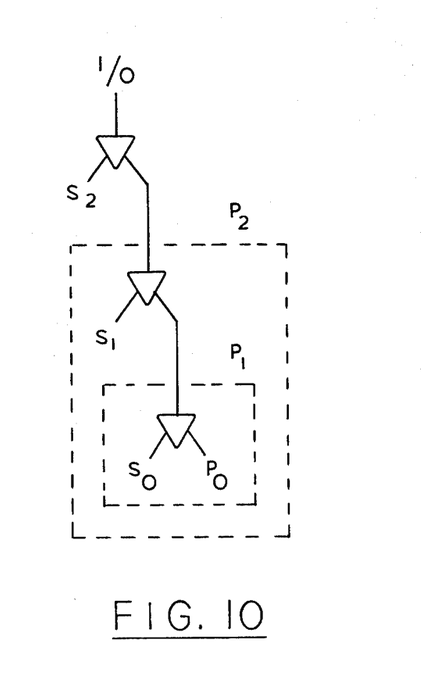

The case where each of three devices is connected to the other two is shown in FIG. 8. This hexagonal connector is of special interest since a number of these connectors can be placed at the nodes of a tree and interconnected with the devices at the leaf nodes. This type of network, an example of which is shown in FIG. 9, allows communication between any of the devices at the leaf nodes with higher priority given to those paths with shorter addresses. The network allows the maximum number of concurrent paths possible without redundancy, but the probability of conflict is higher than in the networks described above with the arbiters and selectors grouped into separate trees. The number of switches required, however, is substantially smaller for the tree of hexagonal connectors. An example of how this type of network might be used is the hierarchy of processors and stores shown in FIG. 10.

Figure 11:
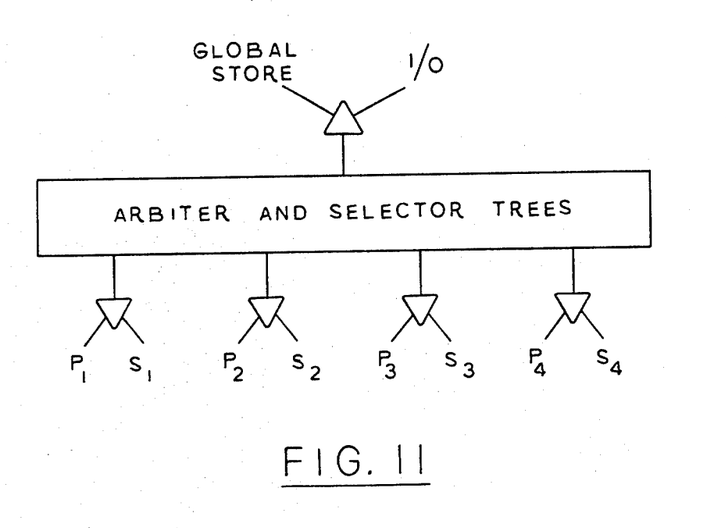

Networks need not be constructed symmetrically or solely of one type of connector. FIG. 11 shows a network using the arbiter and selector trees of FIG. 3 and the hexagonal connector of FIG. 8 to connect a number of processor and store pairs with a global store and an input/output device.

DESCRIPTION OF THE ARBITER SWITCH

Figure 12A:
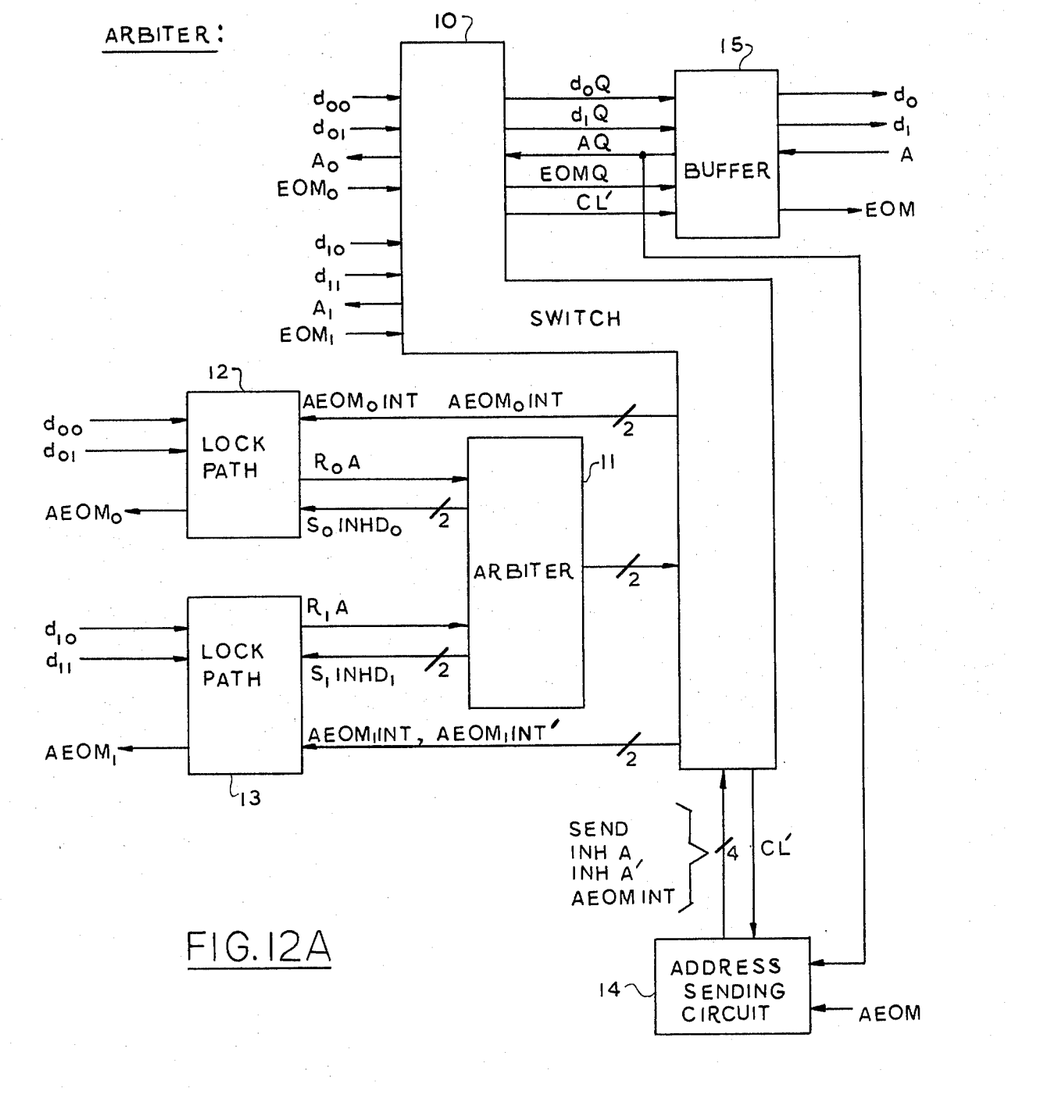
FIGS. 12A-F are schematic diagrams of the arbiter switch.

The arbiter switch will now be described in relation to FIGS. 12A–F. As illustrated in FIG. 12A the arbiter switch includes switch circuit 10, arbiter circuit 11, lock path circuits 12 and 13, address sending circuit 14 and buffer circuit 15.

It is to be remembered that the arbiter switch receives message signals from two different stations or nodes, determines which of the messages is to be transmitted and then transmits that message through the arbiter switch, adding an address bit at the end of the message to indicate which of the two sending nodes transmitted the signal.

Switch circuit 10 receives either data signals $d_{00}$, $d_{01}$, or $d_{10}$, $d_{11}$ as well as the end of message signals $EOM_x$, ($x = 0,1$) from one or the other transmitting station and also returns an acknowledge signal $A_x$ to that station. The respective data signals are also received by corresponding lock path circuits 12 and 13 as will be more thoroughly described below. When such data signals are received by a particular lock path circuit, that circuit transmits a request signal $R_xA$ to arbiter circuit 11 and when such a request has been accepted, arbiter circuit 11 sends a set signal $S_x$ to switch circuit 10 to set switch circuit 10 to that path for subsequent passage of the transmitted message to buffer 15. After the transmission of the message, address sending circuit 14 adds an address bit to the end of the message to indicate which previous node transmitted the message.

Figure 12B:
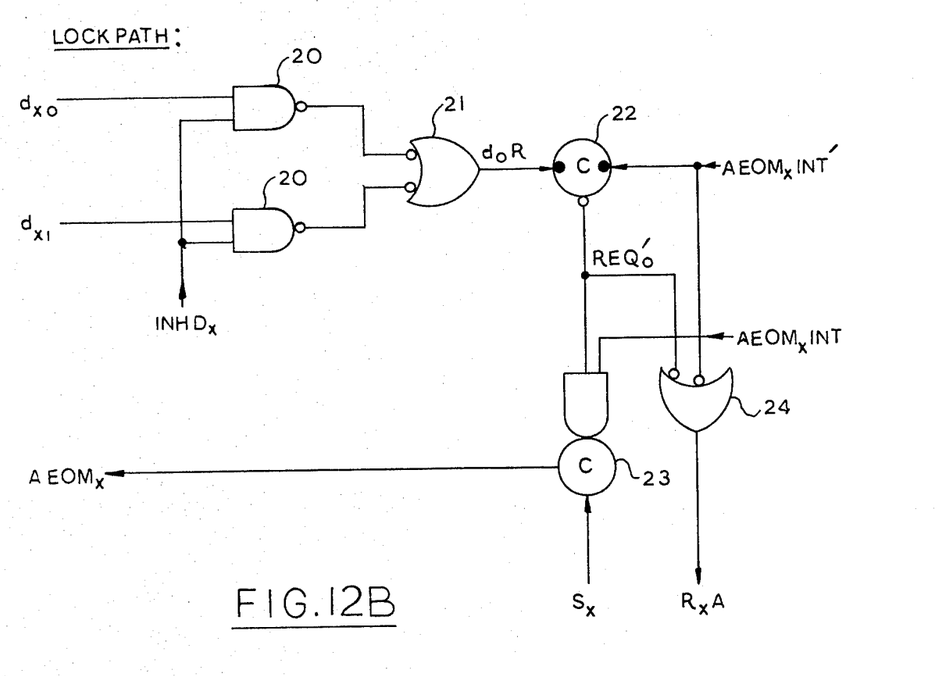
Figure 14A:
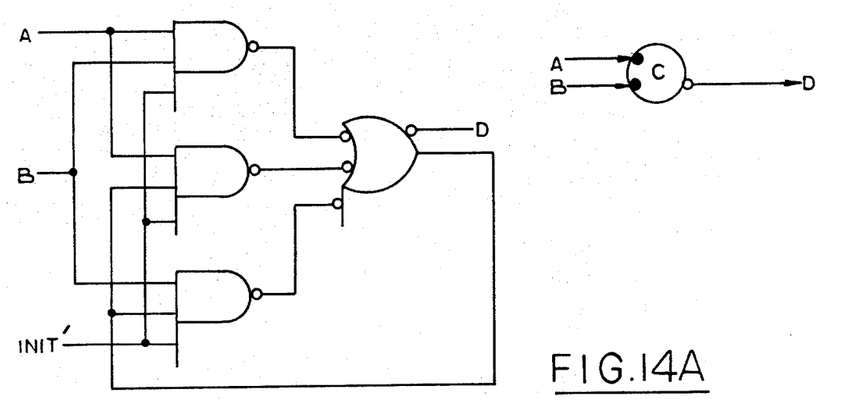
FIGS. 14A-J are schematic diagrams of various circuits employed in the present invention.
Figure 14B:
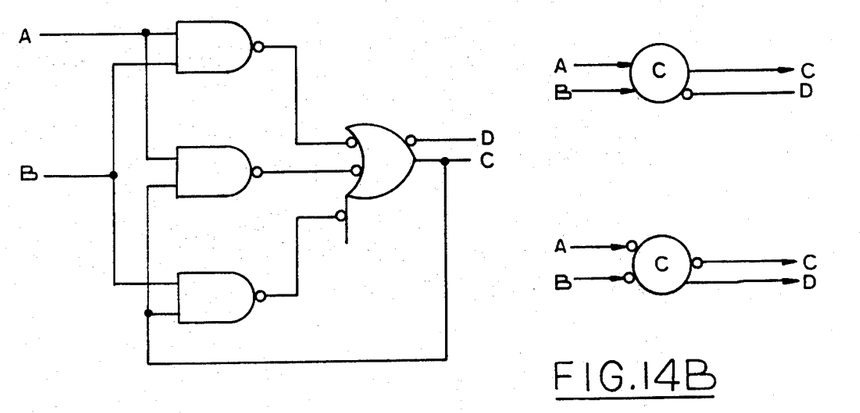
Figure 14C:
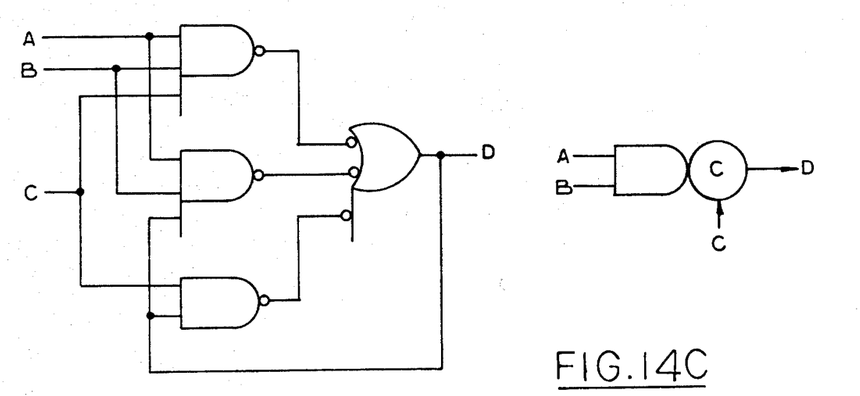

Lock path switches 12 and 13 are identical and are represented in FIG. 12B. The only difference between the two lock path circuits is that they receive signals from a different station or node. The data signals $d_{x0}$ and $d_{x1}$ are received by respective NAND gates 20 where they are NANDED with an inhibiting signal. The outputs of the respective NAND gates are then NANDED together to form a data request signal $d_xR$ which is sent through a C-element circuit 22 that also receives an inverted internal acknowledge end of message signal. The output of C-element 22 is transmitted to C-element circuit 23 which also receives a true internal acknowledge end of message signal. The output of C-element 22 is sent to NAND circuit 24 which transmits the request signal $R_xA$. C-element 23 also receives the set to path x signal $S_x$ and transmits an acknowledge end of message signal $AEOM_x$. C-element circuits 22 and 23 are illustrated in FIGS. 14A and 14C respectively.

Figure 12C:
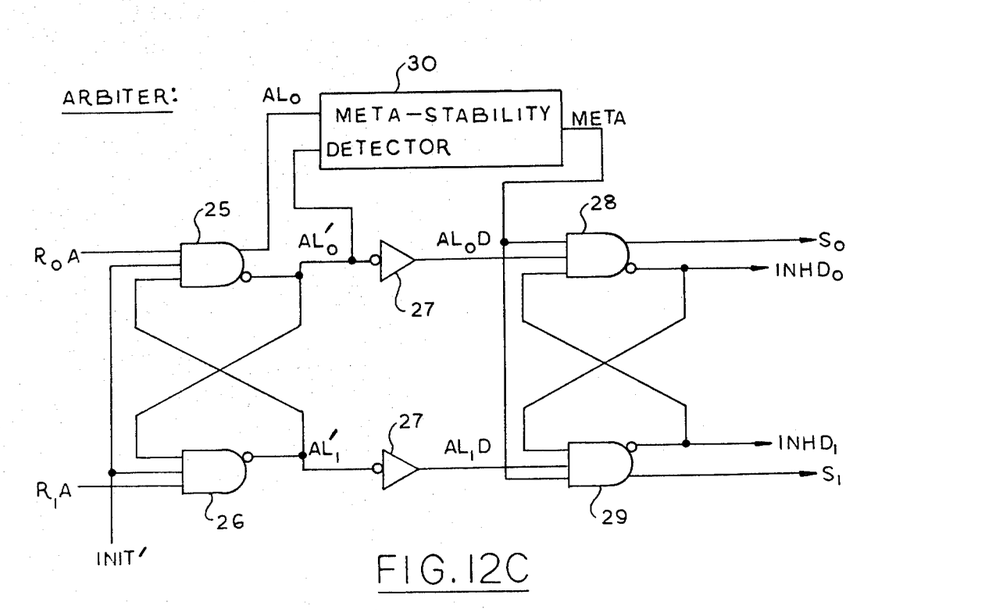

Arbiter circuit 11 of FIG. 12A is illustrated in FIG. 12C. As shown therein, a latch formed of gates 25 and 26, respectively receives the request path to arbiter signals $R_0A$ and $R_1A$ along with an initializing signal. The output of this latch is two inverted locked arbiter signals $AL'_0$, and $AL'_1$. These signals are delayed by inverters 27 before presentation to a latch formed by gates 28 and 29. This latch also receives a signal from metastability detector 30 that has as inputs locked arbiter signal $AL_0$ and the inverse thereof, $AL'_0$. The detector determines whether both inputs are in the high or low signal regions or whether the two signals are in between the high and low regions indicating that the latch is in the metastable state. One output from gates 28 is the set to path zero signal, $S_0$, which is transmitted to switch 10 of FIG. 12A along with set to path one signal $S_1$ from gate 29. Gates 28 and 29 respectively also produce inhibit data signals $INHD_0$ and $INHD_1$ which are transmitted with the corresponding set to path signals back to their related lock path switches.

Figure 12D:
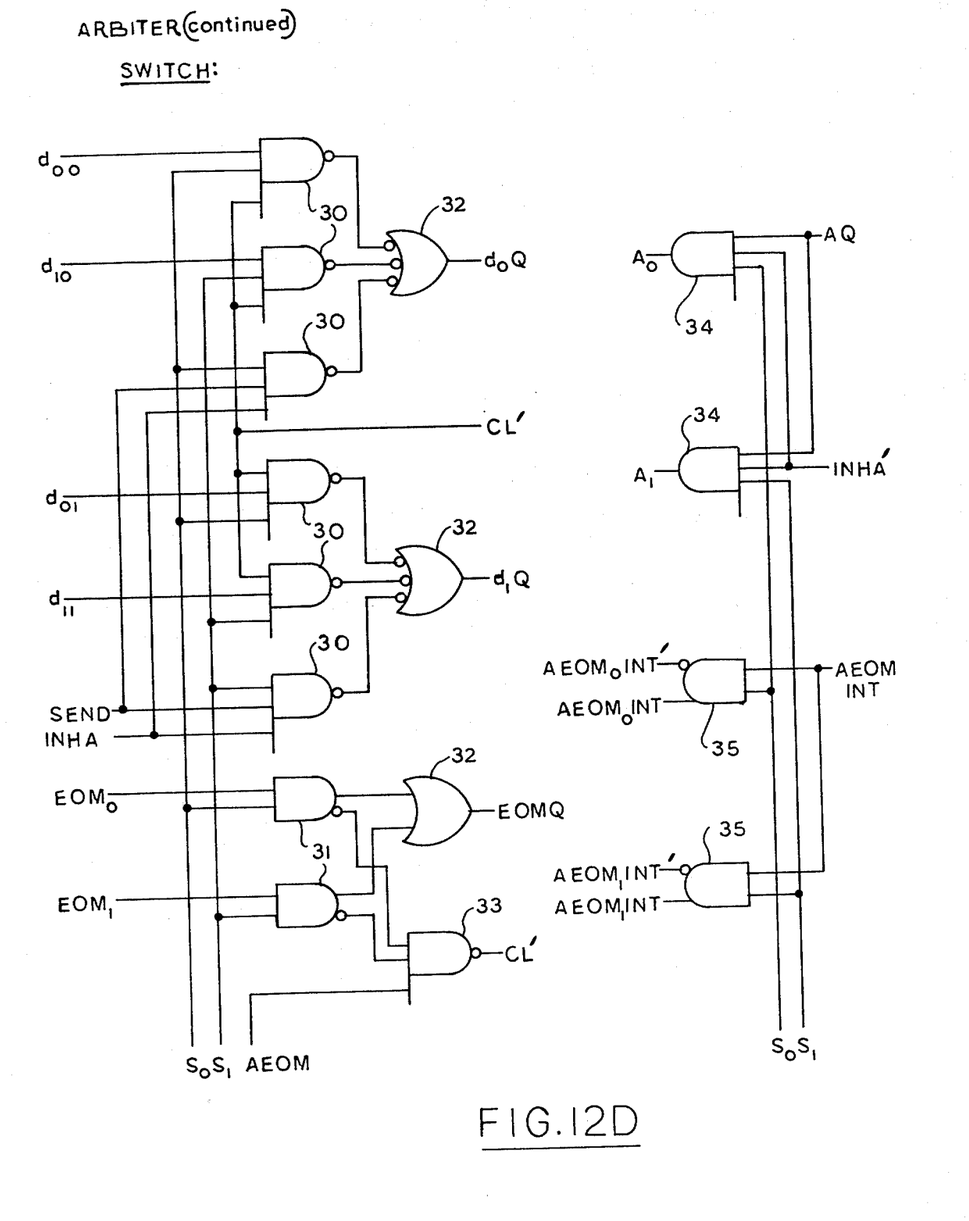

Switch 10 of FIG. 12A will now be described in relation to FIG. 12D. As shown therein, the respective sets of data signals $d_{00}$, $d_{01}$ and $d_{10}$, $d_{11}$ are received by the circuit along with a send signal, an inhibit acknowledge signal as well as the set to path signals $S_0$ and $S_1$. These signals and an inverted clear signal CL' are received by a variety of NAND gates 30 to gate one of the two data sets or the address bit to NAND gates 32 generating the outputs $d_0Q$ and $d_1Q$. In addition, one or the other of the end of message signals $EOM_0$, $EOM_1$ is selectively gated to end of message signal EOMQ by way of AND gates 31 and OR gate 32. Gates 31 also provide gated inverted $EOM_x$ signals which along with an acknowledge end of message signal AEOM are transmitted by NAND gate 33 as an inverted clear signal CL'. The switch provides for transmission of an acknowledge signal in the other direction as either of the acknowledge signals $A_0$ or $A_1$ by way of AND gates 34 depending upon the state of the set to path signals $S_0$ and $S_1$ and the inverted inhibit acknowledge signal. Furthermore, as incoming internal acknowledge end of message signal is gated out by gates 35 as the true and inverse of either of $AEOM_0$ INT or $AEOM_1$ INT, depending again upon the state of the set to path signals $S_0$ and $S_1$.

Figure 12E:
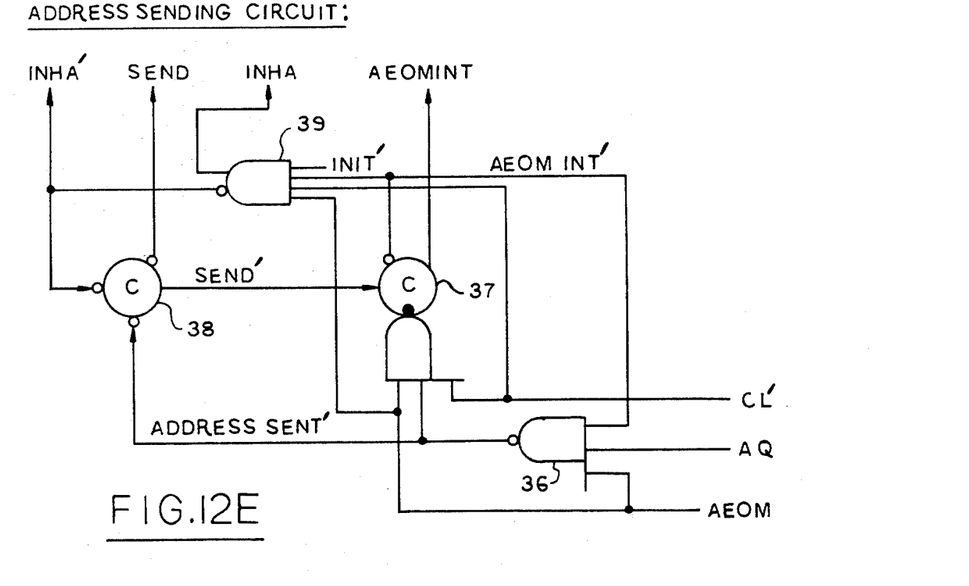
Figure 14D:
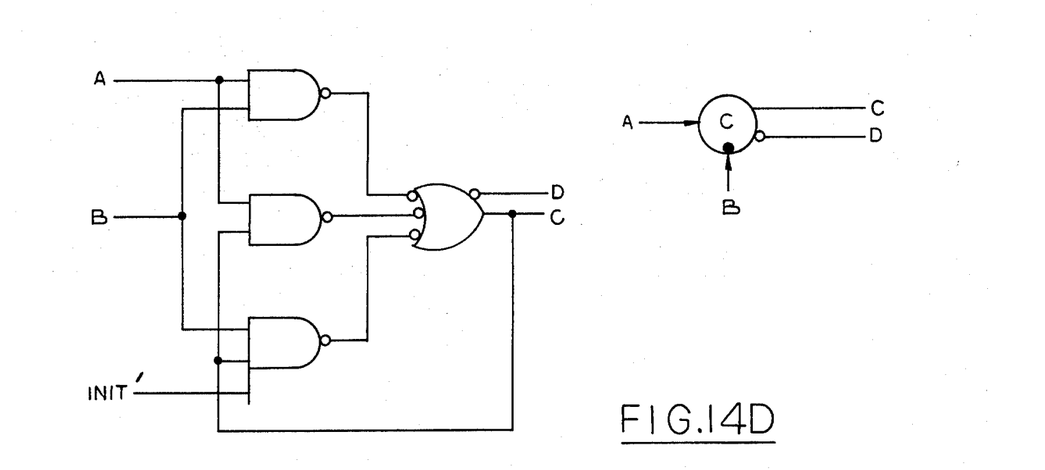
Figure 14E:
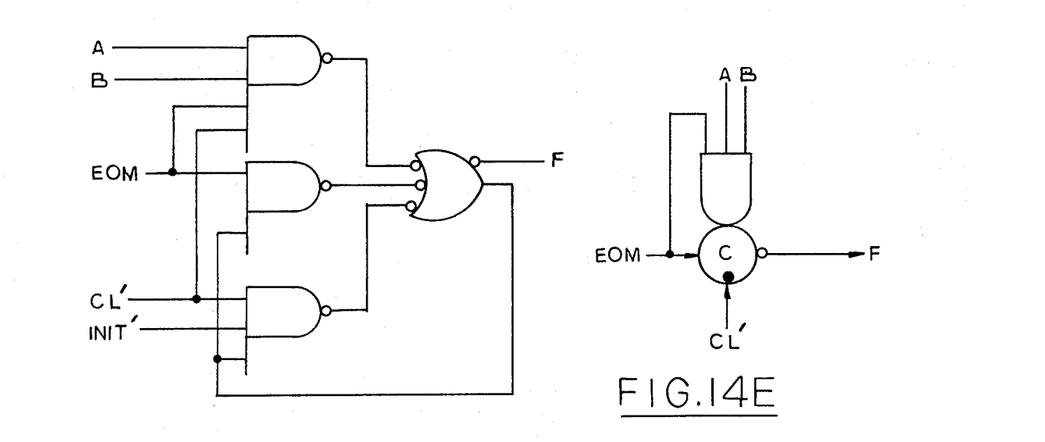
Figure 14F:
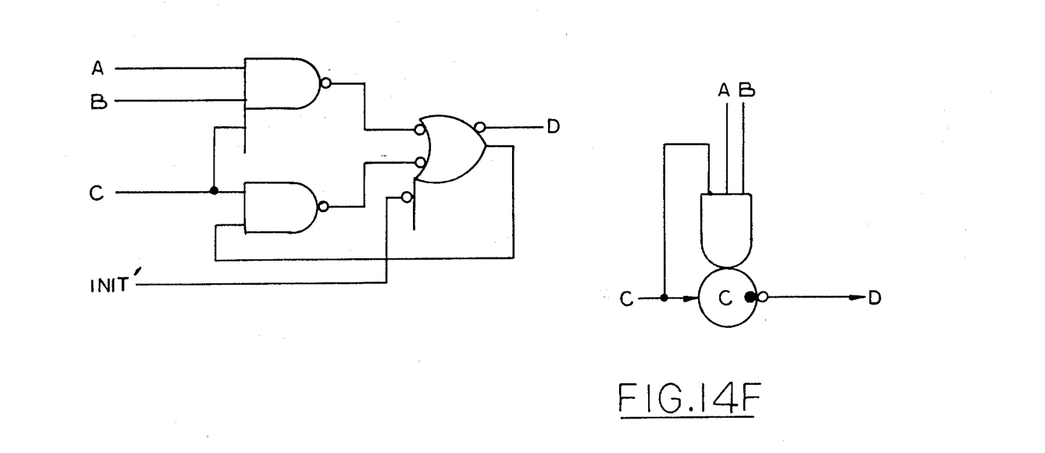
Figure 14G:
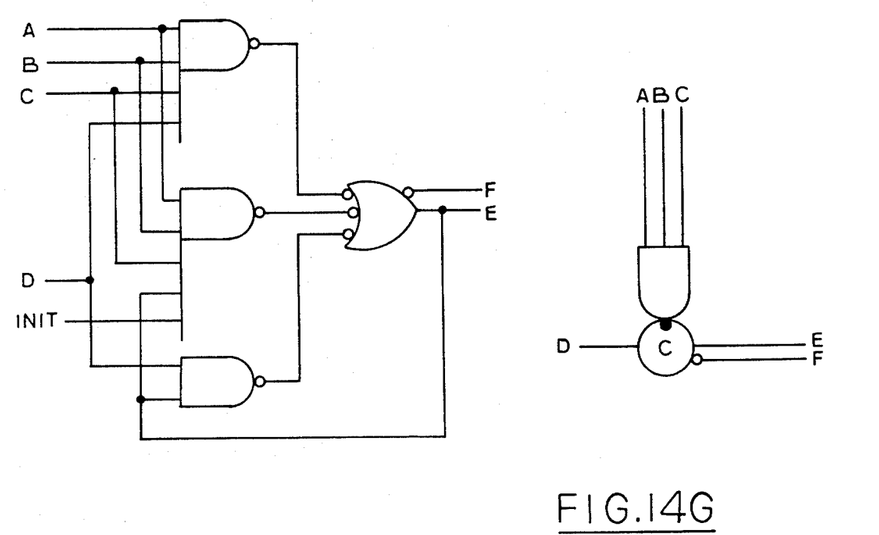
Figure 14H:
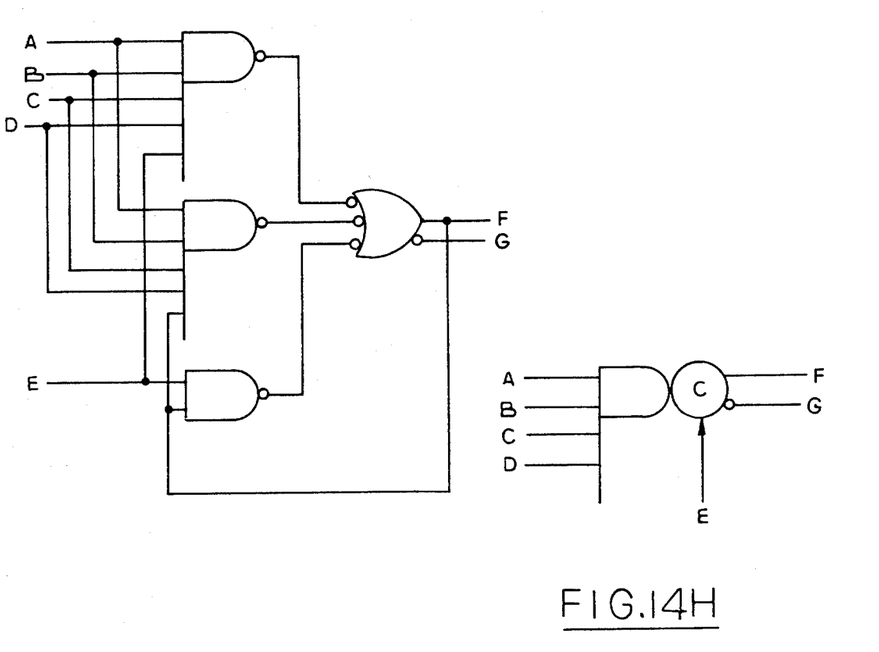
Figure 14I:
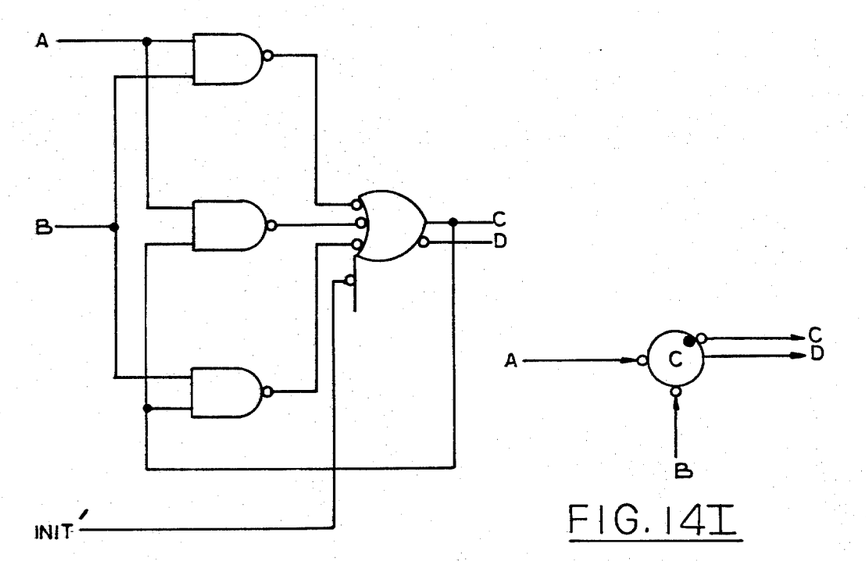
Figure 14J:
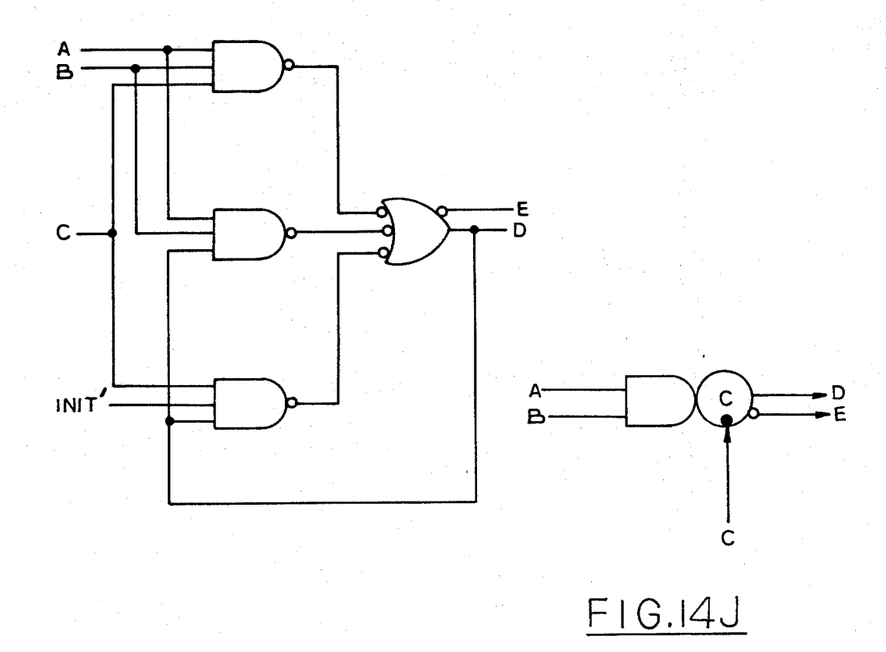

Address sending circuit 14 in FIG. 12A is illustrated in FIG. 12E. As indicated therein, this circuit receives the acknowledge end of message signal AEOM, the internal acknowledge signal AQ and the inverted clear signal CL' and in return generates the true and complement of the inhibit A signal as well as the send signal and the internal AEOM signal. The incoming AQ and AEOM signals are received by NAND gate 36 along with the inverted internal AEOM signal to generate the inverted address sent signal that is transmitted to C-element 37 and 38 which are illustrated in detail in FIGS. 14G and 14B. The inverted clear signal is also received by C-element 37. AND gate 39 receives the AEOM signal, the inverted clear signal CL' and the inverted internal AEOM signal to generate the inhibit acknowledge signal INHA as well as the inverse thereof. C-element 38 generates the send signal, which along with the INHA signal, is required for transmission of the address bit to buffer 15 of FIG. 12A.

Buffer element 15 of FIG. 12A will now be described in relation to FIG. 12F. This element is a two cell queue which provides storage for one bit of data and allows pipelining of data through the switches. The buffer will not allow data to be transmitted from the switch until it can be accepted by the receiving circuit and will not accept data unless there is room to store it. The buffer circuit is also provided with a circuit to delay the end of message signal EOM so that it will not propagate past the last bit of the data preceding it.

Figure 12F:
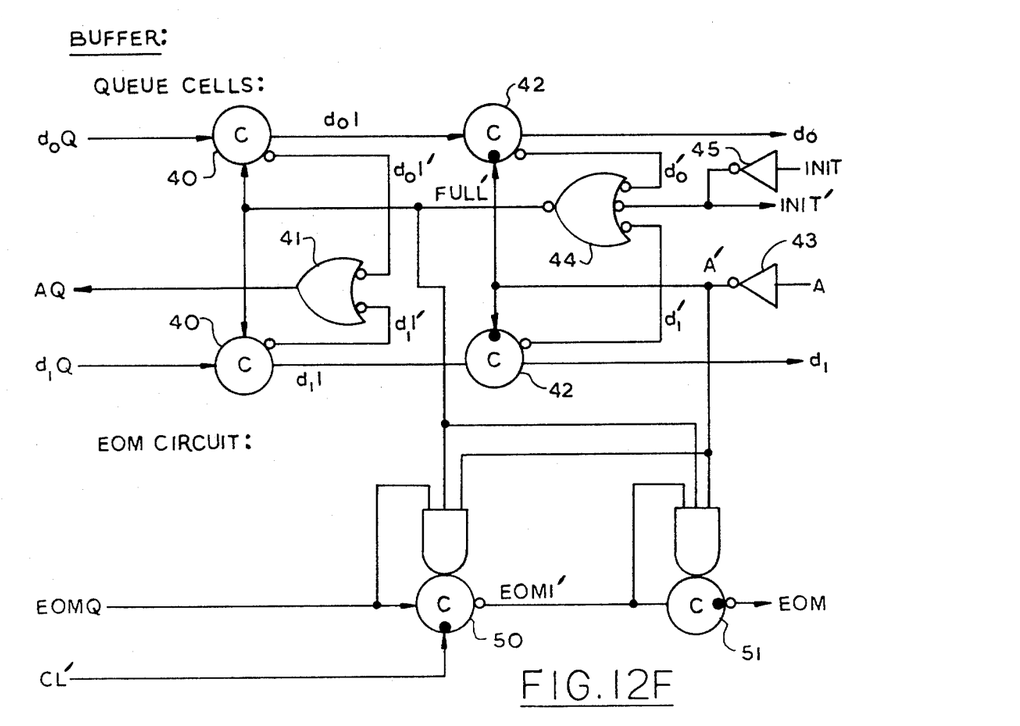

As illustrated in FIG. 12F, internal data signals $d_0Q$ and $d_1Q$ are received by corresponding C-elements 40, which also have as inputs the FULL' signal from gate 44 and which generate the internal data signals $d_0I$ and $d_1I$. The inverses of these last two signals are supplied to gate 41 which in turn sends back internal acknowledge signal AQ. The internal data signals are in turn received by corresponding C-elements 42, the outputs of which are the transmitted data signals $d_0$ and $d_1$. The inverses of these two data signals are supplied to AND gate 44 to generate the FULL' signal sent to C-elements 40. The inverted initialization signal from inverter 45 is also an input to gate 44. The acknowledge signal from the next station or node is inverted by inverter 43 and transmitted to C-elements 42.

The internal end of message signal EOMQ is supplied to C-element 50 which also receives a FULL' signal from gate 44, the inverted acknowledge signal from inverter 43, and the inverted clear signal CL'. In turn, latch 50 supplies the inverted internal end of message signal EOMI' to C-element 51 which also receives a FULL' signal from gate 44 and the inverted acknowledge signal from inverter 43. The output of C-element 51 is the end of message signal EOM which is transmitted to the next station or node. C-elements 40, 42, 50 and 51 are illustrated in detail in FIGS. 14B, 14D, 14E and, 14F respectively.

DESCRIPTION OF THE SELECTOR SWITCH

Figure 13:
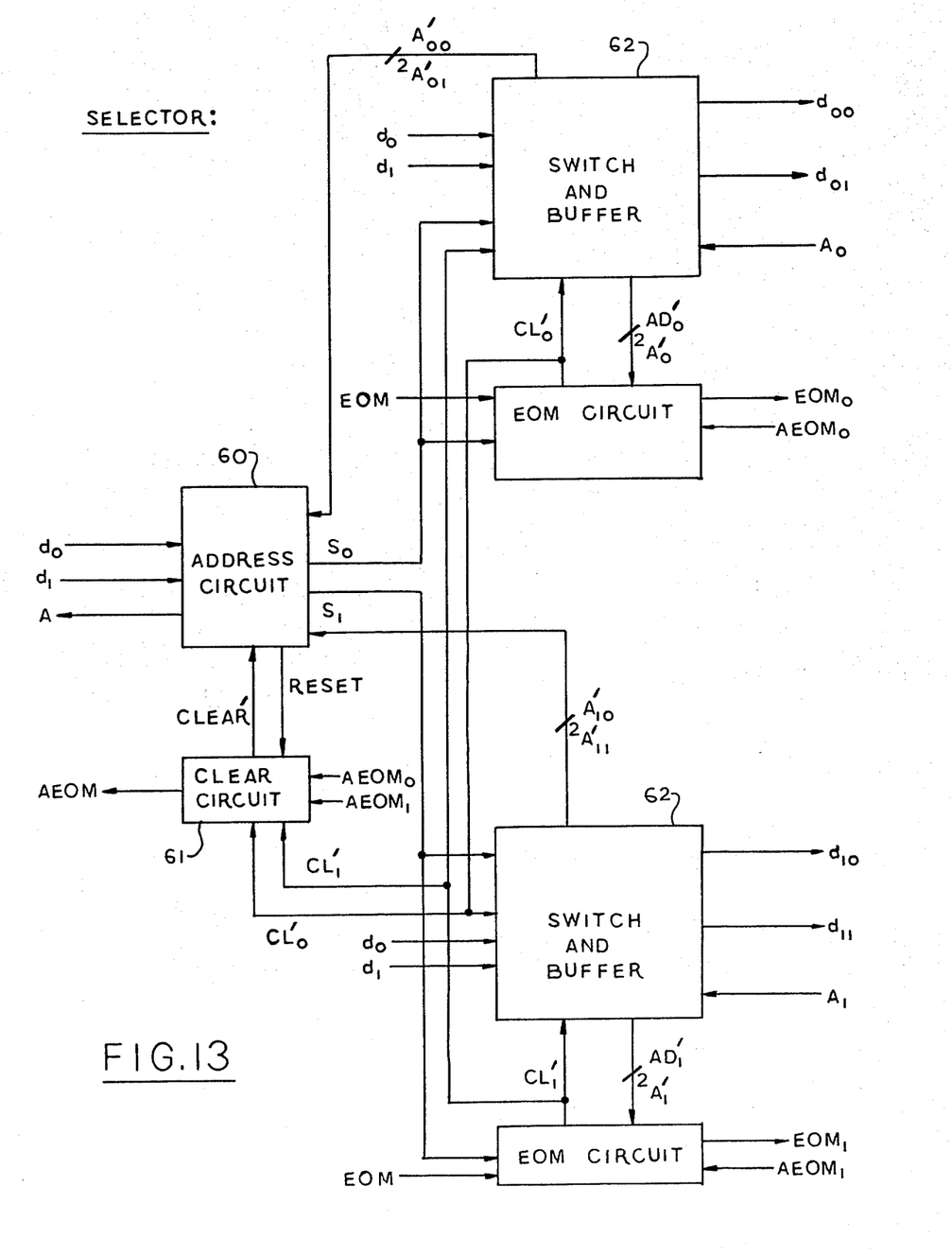
FIG. 13 is a schematic diagram of the selector switch.

The selector switch will now be described in relation to FIG. 13. As illustrated in FIG. 13, the selector switch includes address circuit 60, clear circuit 61, as well as a pair of switch and buffer circuits 62 each with an end of message EOM circuit. The function of the selector switch is to receive messages having a leading address from another station or node and to determine to which of two stations or nodes the message is to be transmitted depending upon the first bit in the address. The first bit in the address sets the circuit path and the rest of the bits are transmitted to the same node until completion of the message is detected and the circuit is cleared. The first bit will then be removed from the address of the following message and the selector path set accordingly.

EPILOGUE

As described above, the present invention is a speed independent arbitration switch for pipelined message transmission through digital communication networks.

While but one embodiment of the present invention has been disclosed, it will be obvious to those skilled in the art that variations and modifications may be made therein without departing from the spirit of the scope of the invention as claimed.

What is claimed is:

1. An arbitration switch for receiving signals from two different nodes of a digital communication network and transmitting those signals to a third node, said switch comprising:
   switch circuit means coupled to receive the respective data signals for each of said two nodes;
   an arbitration circuit coupled to said respective nodes to also receive said respective data signals and to signal said switch circuit to select the first set of said respective data signals to be received for subsequent transmission to said third node;
   a pair of lock path circuits one for each incoming node and responsive to the arrival of said data signals to request the arbitration circuit to set the switch circuit to receive that data first received; and
   a buffer circuit coupled to the switch circuit to receive the selected data signals therefrom for transmission to said third node;
   said buffer circuit including a two cell queue to receive a data bit from the switch means in the first cell and transfer that bit to the second cell only when the second cell is empty.

2. An arbitration switch according to claim 1 further including:

address circuit means coupled to said switch means to add an address signal to the end of the data signals to indicate which of said nodes was selected for transmission.

3. An arbitration switch for receiving signals from two different nodes of a digital communication network and transmitting those signals to a third node, said switch comprising:
switch circuit means coupled to receive the respective data signals for each of said two nodes;
an arbitration circuit coupled to said respective nodes to receive said respective data signals and to signal said switch circuit to select the first set of the data signals to be received for subsequent transmission to said third node; and
address circuit means coupled to said switch means to add an address signal to the end of the data signals to indicate which of said nodes was selected for transmission.

4. The arbitration switch according to claim 3 further including:
a pair of lock path circuits one for each incoming node and responsive to the arrival of data signals to request the arbitration circuit to set the switch circuit to receive that data first received.

5. An arbitration switch according to claim 4 including:
a buffer circuit coupled to the switch circuit to receive data signals therefrom for transmission to said third node.

6. An arbitration switch according to claim 5, wherein:
said buffer circuit includes a two cell queue to receive a data bit from the switch means in the first cell and transfer that bit to the second cell only when the second cell is empty, such buffer circuit enabling pipelining through connected switches.

* * * * *